United States Patent [19]

Lowe et al.

[11] 4,296,082

[45] * Oct. 20, 1981

[54] PURIFICATION OF WET PROCESS PHOSPHORIC ACID

[75] Inventors: Edward J. Lowe, Stourbridge; Michael W. Minshall, Wombourne; Arthur Wilson, Stourbridge, all of England

[73] Assignee: Albright & Wilson Limited, Warley, England

[*] Notice: The portion of the term of this patent subsequent to Jul. 29, 1997, has been disclaimed.

[21] Appl. No.: 28,680

[22] Filed: Apr. 10, 1979

Related U.S. Application Data

[63] Continuation-in-part of Ser. No. 899,896, Apr. 26, 1978, Pat. No. 4,215,098.

[51] Int. Cl.³ .................... C01B 25/40; C01B 25/16; B01D 1/00
[52] U.S. Cl. ................................ 423/305; 23/307; 159/17 R; 159/29; 423/321 R
[58] Field of Search .............. 423/321 R, 305; 23/307

[56] References Cited

U.S. PATENT DOCUMENTS 4,048,289  9/1977  Pierres .................... 423/321 R
4,215,098  7/1980  Lowe et al. ............. 423/321 R

FOREIGN PATENT DOCUMENTS

865710  3/1971  Canada.

Primary Examiner—O. R. Vertiz
Assistant Examiner—Wayne A. Langel
Attorney, Agent, or Firm—Frishauf, Holtz, Goodman & Woodward

[57] ABSTRACT

Wet process phosphoric acid is heated by passing alternating current through the acid, preferably in carbon apparatus to concentrations above 76% $P_2O_5$ and preferably temperatures above 500° C. to remove sulphate and fluoride and convert organic and basic impurities into a filterable precipitate; the acid is separated from the precipitate preferably after dilution with water to provide a high purity crystallizable product.

39 Claims, 2 Drawing Figures

FIG.1

FIG. 2

PURIFICATION OF WET PROCESS PHOSPHORIC ACID

This application is a continuation-in-part application of application Ser. No. 899,896 filed Apr. 26, 1978, U.S. Pat. No. 4,215,098.

The present invention relates to the purification of wet process phosphoric acid.

Wet process phosphoric acid is manufactured by the reaction of an aqueous acid with calcium phosphate rock. The acid used in commercial practice is sulphuric acid which forms a dilute phosphoric acid of about 30% by weight $P_2O_5$ concentration, together with a precipitate of calcium sulphate. After filtration, the product acid is heavily contaminated with sulphate, fluorine compounds, organic matter, arsenic and various basic impurities including iron, aluminium and magnesium. Because of the high level of contamination, wet process phosphoric acid is unsuitable for many of the major commercial uses of phosphoric acid. Such uses require the higher purity of thermal acid, a product made by the much more expensive electric reduction process which involves reducing the phosphate rock in an electric arc furnace to elemental phosphorus, which is oxidised to $P_2O_5$ and dissolved in water to provide relatively pure phosphoric acid of any desired concentration.

Many attempts have been made to concentrate and/or purify wet process acid to obtain a product of greater overall utility. In practice the most commonly used method is to heat the acid under vacuum to distill off water. Because of the physical and chemical limitations of the system the maximum concentration obtainable by this method without serious problems is about 60% by weight $P_2O_5$. This represents the normal commercial concentration of wet process acid. Moreover, this commercial wet process acid contains all but the most highly volatile of the original impurities in a more concentrated form than the original dilute acid.

Proposals for concentrating wet process acids to higher concentrations have included various methods of indirect heating, via heat exchange surfaces, or of direct heating by submerged combustion. Such methods have not succeeded in preparing residual acids more concentrated than about 65 to 75% $P_2O_5$ because of the formation of metaphosphates of the basic impurities which deposit on any heat exchange surfaces as a scale, and which render the pool of residual acid too viscous to handle commercially. The acid, moreover becomes increasingly discoloured. These problems become progressively more severe as the acid is heated to concentrations up to 75% $P_2O_5$.

Moreover when water is evaporated from phosphoric acid, some $P_2O_5$ tends to distil with the water and may be lost from the system. It also presents a potential pollution hazard, necessitating expensive scrubbing operations, which, however, do not provide economical recovery of the $P_2O_5$ since the scrubbings are usually heavily contaminated with volatile impurities, such as fluorine compounds. This factor has also contributed to the difficulties of heating phosphoric acid to concentrations above 70% $P_2O_5$.

The highly viscous, intractable and impure nature of wet process phosphoric acid whenever concentrated up to 75%, and the difficulties of fume emission, have hitherto precluded any substantial investigation of derivatives more concentrated than about 75% $P_2O_5$ and led to a general assumption in the art that it is impractical to obtain more concentrated derivatives at least as commercially useful products, starting from wet process acid.

In British Pat. No. 1,081,894 is described a process for concentrating wet process phosphoric acid by submerged combustion or related techniques up to a concentration of not less than 80% $P_2O_5$ to form a suspension of impurities in a concentrated acid, dilution of that acid and separation of the impurities to leave a purified acid, which is usually reconcentrated. Evaporation by submerged combustion gives significant amounts of insoluble metal metaphosphates, which give scaling of the apparatus, and significant acid losses into the gas effluent, and is difficult to control.

Canadian Pat. No. 865710 describes a method of concentrating wet process phosphoric acid by direct electrical resistance heating and passing through the solution an alternating electric current capable of heating the solution sufficiently to evaporate water therefrom with an essential very narrow range of current densities on the electrodes, the operation being carried out in a vessel with walls of little or no conductivity. The aforesaid Canadian Patent refers to the possibility of concentrating wet process acid above 60% $P_2O_5$, to concentrations corresponding to polyphosphoric acid e.g. 82% or even higher. However, this disclosure can be seen to be speculative since the highest concentration described in the specification as having been attained in any example is 72.5%, and since the apparatus described in the specification and used in all the examples could not have attained significantly higher concentration. This is because the bricks from which the vessel was constructed are known to be unable to withstand the high temperatures and corrosive conditions associated with boiling phosphoric acid having concentrations higher than about 75% $P_2O_5$ or above at atmospheric pressure. Furthermore no other material for the vessel walls is there described which would be stable to such corrosive conditions.

We have now concentrated wet process phosphoric acid by direct electrical resistance heating, using an improved apparatus capable of operating at temperatures in excess of the boiling point of 80% $P_2O_5$ acid. In this way we found, as expected, that at concentrations in the range 65–70% the viscosity rose sharply and there was evidence of the formation of metaphosphates, discolouration of the acid and increasing loss of $P_2O_5$ in fumes. We found that at concentrations above about 76% $P_2O_5$ (i.e. about 320° C. at atmospheric pressure) a number of changes were observed: the trend of increasing discolouration from dark green to dark brown with increasing concentration is reversed in that at about 80% $P_2O_5$ the acid reverts to being a bright green liquid; above about 82% $P_2O_5$ (i.e. about 500° C. at atmospheric pressure) the basic impurities begin to settle out as a filterable sludge of metaphosphate, which, on removal, leaves a mobile product liquid; the sulphate ion, normally regarded as an involatile contaminant, begins to volatilise from the acid above 76% $P_2O_5$ concentration leaving a substantially desulphated acid at about 80% $P_2O_5$, or about 450° C. at atmospheric pressure; the organic impurities are carbonised about 76% $P_2O_5$ to leave filterable particles of carbon which may, possibly, contribute to the purification of the acid by absorption of impurities; and the arsenic is reduced by the carbon to a lower valency state in which it is more easily removed from the system e.g. by reaction with added chloride. The more impure the crude acid the lower the $P_2O_5$ concentration at which the metaphosphates start to settle out. Thus with acid from Moroccan rock significant amounts of impurities precipitate at 80.5% $P_2O_5$ and above, while with Florida acids the start is at lower $P_2O_5$ values.

By the process of this invention a handlable polyphosphoric acid product of substantially increased purity, and concentration in the range 80 to 86% $P_2O_5$, can readily be obtained from wet process acid.

For example, we have discovered that the product acid can be readily diluted to intermediate dilutions, e.g. in the range 50 to 75% $P_2O_5$ at which the cold acid can easily be filtered to remove the carbon and precipitated impurities, leaving a final product acid of greatly improved quality compared with that obtained by concentrating wet process phosphoric acid directly to the equivalent final concentration as taught in the prior art. In particular we have discovered that acid formed by the dilution of our polyphosphoric acid product to appropriate concentrations can be crystallised to provide highly pure ortho or condensed phosphoric acids. This has not hitherto been possible with evaporated wet process phosphoric acid in the absence of additional purification steps. The acid may alternatively be neutralised, e.g. with alkali metal or ammonium base, either simultaneously with, or after, dilution, and either before or after filtration, to provide ortho-, pyro- or polyphosphates. Unlike ordinary concentrated wet process acid, our products show little or no tendency to post-precipitation. After the evaporation, dilution and separation of solids, the purified acid may be reconcentrated but preferably reconcentration is not performed.

Our invention therefore provides a method for the preparation of phosphatic derivatives of wet process phosphoric acid, which comprises heating wet process phosphoric acid, sufficiently to evaporate water therefrom until the acid has a concentration of at least 76% $P_2O_5$ by weight and deposit a filterable sludge of solid impurities, and separating the solution, preferably after dilution with water from the solid impurities. The acid is heated by passing an alternating electric current therethrough. Preferably the concentrated acid is diluted to less than 75% by weight $P_2O_5$ and solid impurities are removed from the acid by filtration. Optionally, phosphatic products may be obtained from the acid, purified and concentrated according to our invention, by crystallizing an orthophosphoric or condensed phosphoric acid from the diluted and filtered solution, or neutralising the acid with an alkali metal or ammonium base either simultaneously with or after dilution and either before, during or after separation of impurities.

Preferably the acid is heated to temperatures in excess of 320° C. e.g. greater than 400° C. (such as 400°-650° C. preferably 430°-610° C. most preferably greater than 500° C. For example temperatures in the range 450°-550° C. or 550° C. to 650° C. are particularly convenient. It is usually convenient to evaporate the acid at substantially atmospheric pressure. At 400°-500° C. the evaporation may be carried out for 15 minutes to 3 hours e.g. 1-2 hours, the longer the evaporation time the more metaphosphate precipitate is formed.

Our invention permits the preparation of phosphoric acid and phosphates having a purity intermediate between wet process and thermal acid, made by a process substantially cheaper and more convenient than the thermal process, or than other known ways of making a comparable intermediate purity acid, such as solvent extraction.

Heating is carried out using a vessel and electrodes capable of withstanding the hot concentrated polyphosphoric acid, such as, preferably, carbon. Conveniently the vessel itself may constitute one electrode. In small scale equipment a central carbon rod may function as the other electrode. It is also possible, and may be preferred in large scale apparatus to have two or more carbon rods as the electrodes according to the phase of the current. The use of carbon, apart from its cost, has other advantages. Ablation of carbon particles from the electrode helps to minimise scaling on the electrode, and the carbon particles may contribute, with carbon formed from the organic material present, to the purification of the acid and the reduction of the arsenic.

The use of electrical heating in a carbon vessel largely overcomes problems of chemical attack on the vessel and heat exchange surfaces. For safety reasons, to avoid difficulties in insulating the vessel we prefer to use relatively low voltages, e.g. 30 to 100 volts, although higher voltages may be employed. The carbon is preferably graphite.

The present invention particularly provides a method for the production of phosphatic derivatives of wet process phosphoric acid which comprises heating wet process phosphoric acid to evaporate water therefrom to leave a concentrated acid, the heating being carried out by direct electrical resistance heating by passing an alternating current thrugh said wet process acid until the concentration of said concentrated acid is about 76% e.g. above 80% by weight $P_5O_5$, precipitating solid impurities from said concentrated acid and separating from said impurities a purified phosphatic derivative, or purified acid.

The electrical heating is carried out with 1 or more electrodes immersed in a pool of acid to be concentrated. Usually the walls of the vessel in which the acid is maintained are made of carbon, particularly graphite, though other electrically conducting materials stable to the concentration of phosphoric acid at the evaporation temperature may be used. Usually there are 1 or more electrodes at least partly immersed in the pool of acid in a vessel with carbon, e.g. graphite, walls and lid; while the walls and lid may be earthed in which case there are 2 or more electrodes dipping into the pool, preferably the walls constitute one electrode and the electrode or electrodes dipping into the pool constitute the other electode.

The electrical heating involves passing alternating current between the electrodes through the acid to be concentrated. The current, voltage, and depth of immersion of the electrodes in the acid are such that there is substantially only resistive heating and the conditions are such as to give no electric arc between the electrodes and no zone of ionized gas around the electrodes. At least a part of all the electrodes therefore remain in continuous contact with the acid. When the walls including the base of the vessel are used as one electrode, then current densities of less than 5 A/sq. in. e.g. less than 4 A/sq. in. such as 0.1-5 or 0.1-4 A/sq. in on the walls may be used, and current densities on the other electrode, at least partly immersed in the acid, are often at least 5 e.g. 7 A/sq. in. particularly at least 20 A/sq. in such as 5-50 e.g. 20-50 especially 30-50 A/sq. in., though on a large scale values of 5-26 e.g. 7-15 A/sq. in. may be more valuable in reducing ablation of the electrode. Ratios of the current density on the central electrode to that on the walls of at least 2:1 e.g. 2-40:1.

The voltage and current input to the heating vessel are adjusted according to the current density on the electrodes wanted, the resistance of the acid, the distance between the electrodes and the temperature to which the acid is to be raised. In a continuous process in which the acid is continuously fed into the heating vessel heated and removed therefrom the rate of flow of acid also affects the voltage and current which are chosen. The process preferably operates with a high current and low voltage in contrast to the low current high voltage of the Canadian Patent 865710. Usually the ratio of the current in amps to the voltage in volts is at least 1:1 preferably at least 7:1, such as 1:1 to 200:1 e.g. 7:1 to 150:1. These conditions are particularly suited when the walls constitute one electrode with at least one immersed electrode.

In general voltages of less than 200 v e.g. 10–200 v particularly 10–150 v and especially 20–100 v with currents of 50–15000 A e.g. 40 v 600 A may be used. The absolute value of voltage and especially the current depend on the size of the vessel and electrode but as in indication values of 40 v and 600 A are suitable for a cylindrical graphite vessel of 9 in. (22.8 cm) internal diameter, 15 in. (38.1 cm) external diameter and 18 in. (45.7 cm) internal height, with a 7.5 in. (19 cm) depth of acid into which a 2 in. (5.1 cm) graphite electrode is partly immersed.

Product acid is preferably withdrawn through an overflow especially when an underflow feed inlet is used, but to avoid by-passing of the cell by the lighter feed acid, and accumulation of carbon sludge, an underflow outlet is preferred when an overhead feed inlet is used. Conveniently the underflow inlet (or outlet) may comprise a vertical channel in the cell wall, whose lower end opens into the cell and whose upper end opens to the exterior.

The wet process feed acid may be partially purified prior to heating, e.g. by any known process such as solvent extraction, dearsenification with sulphide, or desulphation, but the invention is operable, with particular economic benefits, using an unpurified wet process acid. Examples of suitable feedstocks are acids of 50–70% $P_2O_5$, containing 0.1–5% $SO_4$, 0.005%–0.5% F, 0.05–2% Fe, 0.1–1% Mg and 0.01–0.8% Al and 0.005–1.0% organic material (expressed as carbon), all percentages being by weight. Thus the acid may contain 50–70% $P_2O_5$, 0.1–1.5% $SO_4$, 0.005%–0.5% F 0.05–0.5% Fe, 0.1–0.5% Mg and 0.01–0.2% Al, or 50–70% $P_2O_5$, 1.5–5% $SO_4$, 0.005–0.5% F, 0.5–2.0% Fe, 0.3–1% Mg and 0.01–0.8% Al. If the acid has already been purified, e.g. by solvent extraction then impurity concentrations will already be at the low ends of these ranges.

We have further discovered that when phosphoric acid is evaporated in a cascade of at least two evaporators, each evaporator operating at a higher temperature than the preceding one in the cascade, the loss of $P_2O_5$ from the product acid, in evaporating to any given concentration, is substantially reduced.

Our invention, therefore, further provides a method of concentrating phosphoric acid which comprises continuously passing a dilute phosphoric acid successively through a plurality of evaporators, heating the acid in each successive evaporator to progressively higher temperatures sufficient to evaporate water from the acid in each evaporator and to increase progressively the concentration of the acid.

Preferably each evaporator in our further embodiment comprises a closed vessel provided with an outlet for vapour, means for adding feed acid, means for withdrawing more concentrated acid, and means for heating the acid, which in our preferred embodiment may comprise electrodes between which a sufficiently strong alternating current may be passed to heat the acid and evaporate water therefrom. Preferably, especially where the evaporator is to operate at relatively high temperatures, the vessel is of carbon as hereinbefore described. The feed acid may be, for example, wet process phosphoric acid, e.g. 30% wet process acid, thermal acid or a partially purified wet process acid such as solvent extracted acid.

Apparatus for the concentration of phosphoric acid comprises a series of at least two evaporators capable of withstanding hot phosphoric acid; each evaporator comprising a closed vessel provided with an acid inlet, an acid outlet, a vapour outlet and heating means; the acid outlet of each evaporator, except the last, communicates with the acid inlet of the next successive evaporator; at least the last evaporator in the series is constructed of carbon and has heating means comprising at least one carbon electrode and means for passing alternating electric current between one electrode and either the vessel or another electrode; and at least two condensers one of which is adapted to condense at least part of the vapour from at least the first evaporator, separately from the vapour from at least the last evaporator and one other of which is adapted to condense at least part of the vapour from at least the last evaporator separately from the vapour from at least the first evaporator.

The feed acid may be concentrated in stages up to 60% by weight $P_2O_5$ or higher, e.g. concentrations corresponding to polyphosphoric acids up to about 86% $P_2O_5$ at which phosphoric acid distils off. An advantage of the invention is that most of the volatile impurities are removed in the earlier stages, while the $P_2O_5$ losses occur mainly in the later stages permitting the $P_2O_5$ to be recovered separately from the volatile impurities. The liquid in the final evaporator in the cascade may be recovered to provide a concentrated product acid.

According to a particular embodiment of our invention, we have found that it is possible according to our invention to heat the acid at least to the boiling point of metaphosphoric acid at about 650° C., when the concentration reaches about 86% by weight $P_2O_5$, whereupon phosphoric acid distils over (and is recovered from the vapour). According to this embodiment the evaporator, or the last evaporator, if, as is preferred, a cascade system is being used, operates at a sufficiently high temperature to distil phosphoric acid which may be passed into a condenser or scrubber for collection as a highly purified product acid. The residual acid constitutes a second product of intermediate purity, which may be separately recovered.

The product of the electrical concentration step whether a single evaporator or a series of evaporators is used, is a suspension of insoluble solid impurities in concentrated acid with a total amount of $P_2O_5$ of at least 76% e.g. at least 78% such as 78–86% and particularly 80–86% such as 82–86%. The solid impurities are believed to be mostly metal metaphosphates, usually with up to 87% e.g. 50–87% and especially 80–85% of the metals present in the feed acid having precipitated as meta phosphates. The sulphate and fluoride contents of the product of the concentration step are significantly reduced over the values in the feed acid. The product of the concentration step also contains polyphosphoric acids, the amount depending on the evaporation temperature and the total $P_2O_5$ content, as the poly acid content is at the equilibrium value.

Polyphosphoric acids obtained according to our invention may be crystallized as such, after separation of solid impurities, or preferably diluted to concentrations corresponding to orthophosphoric or pyrophosphoric acids, which may be crystallized from the system, after removal of the impurities, e.g. by decantation or, preferably, filtration. When the polyacid product of the electrical concentration step is diluted with water, the product acid obtained is usually left to equilibrate to contain the amount if any of polyacid in equilibrium with ortho acid at that $P_2O_5$ content. Crystallization of anhydrous orthophosphoric acid may be effected from diluted phosphoric acids of $P_2O_5$ concentrations by weight above 68.64% to 75.4% preferably 70 to 74% e.g. 72.5%, or as the hemi hydrate from diluted phosphoric acids of concentrations from 68.6% down to 47% e.g. 55–68% such as 62–68%. Concentrations below 58% require cooling below 0° C. Pyrophosphoric acid is crystallized between 75.4% $P_2O_5$ and about 83% $P_2O_5$, preferably 74 to 81% e.g. 80%. At higher concentrations higher polyphosphoric acids may be crystallized. In the crystallization of anhydrous or hemi hydrate ortho phosphoric acid, it is preferred to seed the diluted acid with crystals of either acid and quickly at the appropriate temperature crystals are formed, e.g. in 5 mins to 1 hour though longer times e.g. up to 8 hours may be used. Crystallization of anhydrous ortho acid is preferred as the crystallization temperature is usually higher e.g. 15°–30° C. for 70–74% $P_2O_5$ acid than the 0°–15° C. for 60–68% $P_2O_5$ acid for making the hemi hydrate. When the anhydrous ortho acid is being crystallized from a 70–74% $P_2O_5$ acid e.g. 71–74 or 72.7–74% especially at 71–74% $P_2O_5$, the acid also contains its equilibrium amount of polyphosphoric acids namely 2.6–26 e.g. 10–26% or 16–26% poly $P_2O_5$, respectively. Advantageously the crystals are separated from the mother liquor and recrystallized at least once more, often 1–3 times more, to give a highly purified acid e.g. of 72.2% $P_2O_5$ and less than 100 ppm Fe, Al, $SO_4$ and F. Preferably in a continuous process, the crystallization temperature is chosen to give 35–60% of the acid as crystals, with the rest as a first mother liquor. In a preferred process, this first mother liquor is crystallized further, with 25–50% of the remaining acid being collected as a second crop of crystals from a second mother liquor, the original crystals and second crop are combined, remelted and recrystallized with 30–60% e.g. 40–60% of the acid being separated as crystals from a third mother liquor which is recycled to the first crystallization.

The second mother liquor may be crystallized further to recover even more crystalline acid as a third crop of crystals which are separated from a fourth mother liquor. The third crop of crystals may be recycled to the first crystallization and the fourth mother liquor may be recycled and mixed with the original feed acid to the electrical evaporator. In this integrated process, the products are twice crystallized acid of high purity e.g. with less than 200 ppm each of Fe and Al, the amount of $P_2O_5$ in the acid representing 30–85% e.g. 50–80% of the $P_2O_5$ in the acid fed to the electrical evaporator, and insoluble metal salts, particularly metaphosphates separated after the concentration and dilution with only a minor amount of phosphate losses in the effluent from the evaporator. The crystallization and recrystallization is usually carried out without washing the crystals with organic solvents, because the latter tend to discolour the acid.

The acid of 70–74% $P_2O_5$ which is crystallized often contains less than 3500 ppm Fe e.g. less than 2500 ppm Fe and less than 1400 ppm Al e.g. less than 1000 ppm Al.

Alternatively instead of crystallizing the acid the polyphosphoric acids obtained from electrical concentration step or diluted acid may be neutralized wholly or partially with a suitable base to form poly-, pyro-, or ortho-phosphates. Neutralisation may be effected before or after separation of the impurities. The base is preferably a hydroxide or carbonate of an alkali metal e.g. lithium or, most preferably sodium or potassium or of ammonium and may be added as an aqueous solution. The aqueous base reacts with polyphosphoric acids to form polyphosphates or with diluted acid, which has had time to equilibrate with the added water, to form ortho- and/or pyro- phosphates according to the concentration of the acid. Other phosphates may also be prepared according to the invention by adding the oxide, hydroxide or carbonate of an appropriate metal, e.g. alkaline earth metals such as calcium, barium or strontium or copper, chromium, nickel, zinc, aluminium or ferrous or ferric iron, or an organic base such as an amine e.g. ethanolamine. Where an insoluble or sparingly soluble phosphate is involved it is naturally preferred to separate the impurities prior to neutralisation, and to recover the product by crystallisation and/or filtration.

It is possible to concentrate the acid to a concentration corresponding to a condensed phosphoric acid, e.g. pyrophosphoric and either, after separation of the impurities, crystallise the appropriate acid, or carry out the neutralisation as hereinbefore described to obtain the appropriate condensed phosphate. However, in the case of pyrophosphoric acid, it is preferred to concentrate the wet process acid initially to concentrations above 85% $P_2O_5$ and then dilute back to about 80% $P_2O_5$. Neutralisation of acid equilibrated with water at intermediate concentrations (e.g. between 73 and 79% $P_2O_5$) may be used to prepare mixed phosphates.

Neutralisation and dilution may also be effected simultaneously by adding aqueous base directly to the polyphosphoric acids to form a polyphosphate product.

The diluted and filtered acid may alternatively be sold as an intermediate purity phosphoric acid product of higher quality, and therefore wider utility, than the feed. It is also possible to use the concentrated acid, after separation from solid impurities, as a catalyst, without further dilution.

Figure 1:
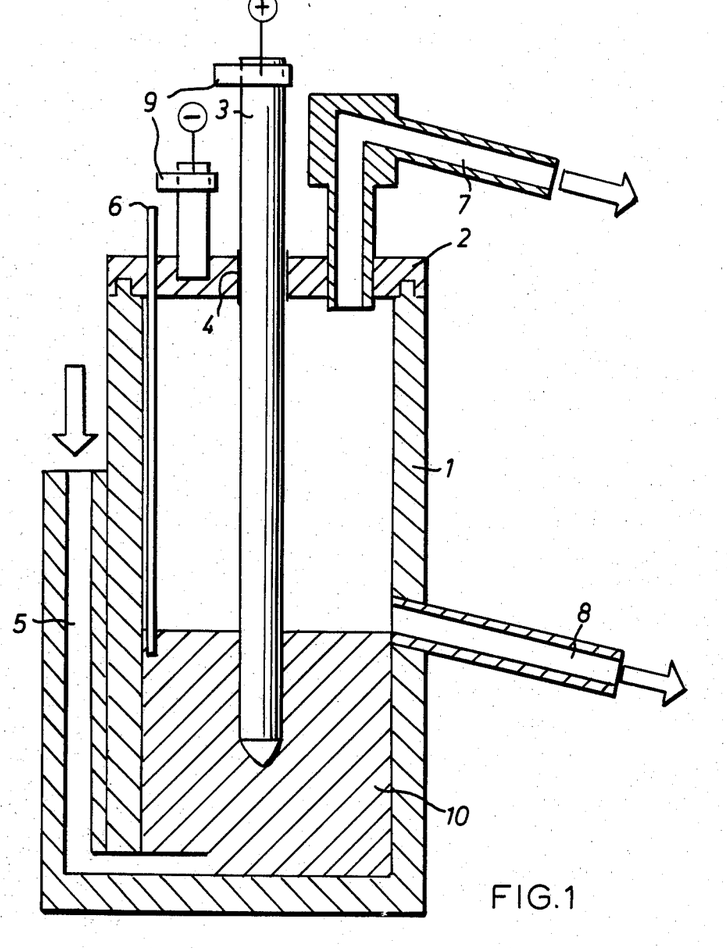
Figure 2:
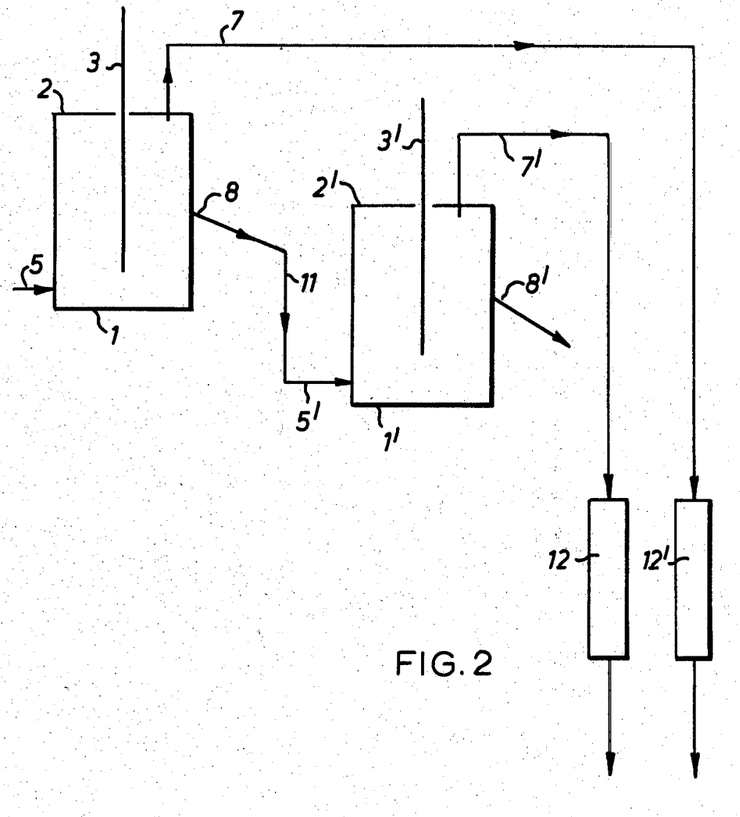

Typical apparatus for use according to the invention will be described with reference to the accompanying drawings of which FIG. 1 is a sectional elevation of one cell for use in the invention and FIG. 2 is diagrammatic flow sheet of a cascade of two cells. The apparatus comprises two graphite vessels (1),(1′) each provided with an inlet feed pipe, (5),(5′) respectively, and a graphite lid, (2),(2′). The lids (2),(2′) each have a graphite electrode rod, (3),(3′) respectively, projecting vertically through the centre and downwards into the vessel, (1),(1′) respectively, and insulated from the lid by a refractory sheath, (4). Each lid (2),(2′) is also provided with a temperature sensor, (6), and a vapour outlet duct, (7),(7') respectively. Each vessel (1),(1') is provided with a product outlet duct, (8),(8') respectively, opening at a point intermediate between the top and bottom of the vessel. The vessels (1),(1') and electrodes (3),(3') are each provided with water cooled copper clips, (9) for connection to a power supply (not shown). The product outlet duct (8) of the vessel (1) communicates via a line (11) with the inlet feed pipe (5') of the vessel (1'). The vapour outlets (7),(7') are provided with separate condensers, (12),(12') respectively.

To prevent leakage the vessels (1),(1') may be sealed externally with a resin bonded cement of crushed anthracite and powered quartz and encased in a stainless steel jacket (not shown).

In use, feed acid is run continuously into the vessel (1) through the inlet feed pipe (5) to form a pool of acid (10) whose depth is determined by the height of the product outlet duct (8). Concentrated product acid passes through the outlet duct (8).

In a process with the cascade of two cells, the acid from duct 8 passes via the line (12) to the inlet feed pipe (5') and enters the vessel (1'). Product acid is discharged continuously through the product outlet duct (8'). Alternating electric current (e.g. a single phase 40 volt 600 amp. current) is passed between the electrodes (3),(3') and the vessels (1),(1') respectively. The acid in the pools (10) is heated and the vapour is recovered through the vapour outlet ducts (7),(7') and passed through the condensers (12),(12') as fluorine rich and phosphorus rich condensates respectively. Typically the acid in the pool (10) may be heated to a temperature between 200° C. and 400° C. e.g. 300° C. in the vessel (1) and that in the vessel (1') to a temperature of from 400° to 650° C., e.g. 550° C.

The invention is illustrated in the following Examples in which all the electrical heating processes were operated continuously until constant conditions were achieved. Evaporators as described with reference to FIG. 1 of the accompanying drawings were used in Examples 6–12, while similar ones to said evaporators but with an upper acid inlet and lower acid outlet were used in Examples 1–5. The graphite evaporators for Ex. 1, 2 was cylindrical with 3 in. (7.6 cm) internal diameter with a 0.75 in (1.9 cm) central graphite electrode dipping into the acid; the power input was 1.76 kw at 80 A 20 V with 35–40 A/sq. in. current density on the central electrode and a 2.7 A/sq. in. current density on the electrode walls of the vessel. In Ex. 3–5, the graphite evaporator was cylindrical with a 12 in. (30.5 cm) internal diameter, a pool of acid 10 in. (25.4 cm) depth having immersed therein a central 2.5 in. (6.35 cm) graphite electrode; the power input was 21 kw at 700 A 30 V with current densities of 38 A/sq. in. and 1.4 A/sq. in. on the central electrode and walls respectively. In Ex. 7–12, the cylindrical graphite evaporator had a 5 in. (12.7 cm) internal diameter, a 4.5 in. (11.4 cm) depth of acid in which was immersed a 1 in. (2.54 cm) graphite central electrode; the power input was 3 kw at 125 A 24 V with current densities of 35–40 A/sq. in. and 1.6 A/sq. in. on the central electrode and walls respectively.

EXAMPLE 1

A Feed acid was prepared by two stage counter-current extraction of wet process acid with methyl isobutyl ketone, counter-current scrubbing of the oganic extract with water, followed by two stage counter-current release of $P_2O_5$ into water (generally as described in U.S. Pat. No. 3,914,382).

To test the removal of impurities at increasing levels of concentration of acid the acid feed was concentrated at increasing temperatures in the single cell as described hereinbefore, with reference to FIG. 1 of the drawings. The composition of the feed and product acids are given in the following Table 1. In each case the evaporated acid contained insoluble precipitates; all the analyses apart from "ppm organics filt" were on the suspension acid. Each suspension of evaporated acid was filtered and then analysis for organics on the filtered acid carried out.

TABLE 1

| Temperature, °C. | Power Kwh per Kg of acid | Suspended carbon | % $P_2O_5$ | ppm $SO_4$ | ppm F | ppm As | ppm organics Filt | ppm organics Non-Filt |
|---|---|---|---|---|---|---|---|---|
| 20 | — | — | 60.0 | 9930 | 166 | 6.06 | 82 | |
| 250 | 0.325 | 145 | 73.4 | 8127 | 93 | 7.30 | 25 | 139 |
| 300 | 0.400 | 319 | 75.3 | 6160 | 80 | 6.49 | 21 | 260 |
| 340 | 0.417 | 320 | 76.5 | 4575 | 71 | 7.08 | 15 | 239 |
| 380 | 0.508 | 290 | 78.2 | 2786 | 54 | 6.87 | <15 | 244 |
| 420 | 0.627 | 422 | 79.9 | 904 | 35 | 8.02 | <15 | 347 |
| 460 | 0.701 | 710 | 81.1 | 185 | 23 | 6.75 | <15 | 651 |
| 500 | 0.953 | 903 | 82.3 | <100 | 13 | 6.07 | <15 | 507 |

EXAMPLE 2

A concentrated acid according to Example 1 at 450° C. containing 80.5% $P_2O_5$ was neutralised with a 49% potassium hydroxide solution to give an alkaline potassium polyphosphate with a mean polyphosphate chain length of 2.1. The main application is as builder for liquid detergents.

The reaction temperature was controlled at <40° C. and the pH controlled at 8–9. After neutralisation the product was adjusted to pH 11. The polyphosphate could then be simply filtered, through a candle filter at 20–50 psi.

The $P_2O_5$ distribution is given in Table 2, with the chemical analysis.

TABLE 2

| $P_2O_5$ Distribution | | | | | | | | |
|---|---|---|---|---|---|---|---|---|
| ortho | | | | 17% | | | | |
| pyro | | | | 40% | | | | |
| tripoly | | | | 25% | | | | |
| higher | | | | 18% | | | | |
| ppm $SO_4$ | ppm F | ppm Cl | ppm As | ppm organic C | ppm Zn | ppm Cu | ppm Pb | ppm Fe |
| 62 | 5.4 | 10 | 4.2 | 15 | <1 | <1 | <1 | 6 |

EXAMPLE 3

A concentrated acid according to Example 1 at 450° C. containing 80% $P_2O_5$ was diluted to a typical orthophosphoric acid concentration, of 60% $P_2O_5$. This acid was neutralised with a 49% potassium hydroxide solution to give a dipotassium orthophosphate solution, which was easily filtered, through a candle filter.

The reaction temperature was controlled at <70° C. and the pH controlled at 7–9. The chemical analysis is given in Table 3.

TABLE 3

| % $P_2O_5$ | ortho | >90% |
|---|---|---|
| $SO_4$ | ppm | 155 |
| F | " | 6.1 |
| Cl | " | 16 |
| As | " | 1.9 |
| organic C | " | 15 |
| Zn | ppm | 2 |
| Fe | " | 16 |
| Pb | " | 2 |
| Cu | " | <1 |

EXAMPLE 4

A concentrated acid prepared by the method of Example 1 as in Ex 3 was dearsenified by heating at various temperatures between 100° C. and 200° C. with sodium chloride. The initial concentration of arsenic was in excess of 10 ppm. The results are as expressed in Table 4.

TABLE 4

| ppm Cl (as NaCl) | Temperature °C. | Residence Time minutes | ppm As | ppm Cl |
|---|---|---|---|---|
|  | 120 | 30 | 2.1 |  |
| 1000 | 150 | 30 | 3.2 |  |
|  | 180 | 30 | 6.4 |  |
|  | 120 | 5 | <1 | 86 |
| 2000 | 150 | 5 | <1 | <5 |
|  | 180 | 5 | 1.7 | 15 |

No comparable reduction in arsenic levels could be obtained by heating the initial feed acids with chloride.

EXAMPLE 5

A concentrated dearsenified acid preparation according to Example 4 contained 0.05% w/w suspended carbon, giving the acid a black appearance. The acid was diluted to 63.5% $P_2O_5$ and filtered through a bed of diatomaceous earth on a "terylene" filter cloth to provide a clear high grade phosphoric acid. The result is shown in Table 5.

TABLE 5

|  |  | Feed Acid | Re-diluted acid and filtered acid |
|---|---|---|---|
| $P_2O_5$ | % | 63.5 | 63.5 |
| $SO_4$ | ppm | 8750 | 114 |
| F | ppm | 140 | 18 |
| Cl | ppm | <10 | <10 |
| As | ppm | 18.7 | <1 |
| Organic C | ppm | 50 | 6 |
| Total C | ppm |  | 7 |
| Si | ppm |  | <10 |

EXAMPLE 6

Fractional Condensation

A cascade of two vessels as hereinbefore described with reference to the drawings was heated to the following temperatures:

|  |  | Sample No. |
|---|---|---|
| Pot (1) = 300° C. | Pot (2) = 400° C. | A |
| = 400° C. | = 500° C. | B |
| 500° C. | = 600–70° C. | C |

Vapours were condensed (using a glass condenser within a graphite column) from pot (2) only, at each of the given temperatures. No entrainment device was used.

The results obtained expressed in parts per million by weight, except where otherwise stated were as follows: for the feed acid and for the vapours from pot (2) in Experiments Samples A, B, and C.

| | A | B | C | Feed Acid |
|---|---|---|---|---|
| $P_2O_5$ % | 3.11 | 8.91 | 44.8 | 53.6 |
| $SO_4$ % | 1.69 | 2.35 | 0.46 | 0.84 |
| F | 5930 | 6270 | 1370 | 1225 |
| As | 1.9 | 4.0 | 7.6 | 9.9 |
| Total C | 105 | 65 | 50 | 223 |
| Fe | 45 | 29 | 105 | 0.174% |
| Al | 58 | 57 | 69 | 810 |
| Mg | 25 | 6 | 31 | 0.380% |
| B | 30 | 29 | 42 | 36 |
| Ca | 590 | 260 | 140 | 130 |
| Si | 0.164% | 0.163% | 400 | 300 |
| Na | 410 | 410 | 150 |  |
| V | 2 | 1 | 2 | 231 |
| Ni | 1 | 1 | 1 | 43 |
| Sn | 1 | 1 | 1 |  |
| Cd | 1 | 1 | 1 | 21 |
| Cr | 3 | 1 | 5 | 374 |
| Zn | 5 | 3 | 33 | 140 |
| Pb | 8 | 1 | 1 | 3 |
| Cu | 1 | 1 | 2 | 43 |

EXAMPLE 7

Neutralisation

A crude wet process acid was concentrated in a single cell as herein described with reference to FIG. 1 of the drawings, at about 450° C. to produce acid of 81% $P_2O_5$ concentration. Part of this acid was neutralised with 49% potassium hydroxide and then filtered without difficulty to leave a solution of potassium pyrophosphate. The other part was diluted with water to ortho strength acid (i.e. 54.5% $P_2O_5$) and neutralised with 46% sodium hydroxide solution and again filtered without difficulty to leave a solution of monosodium phosphate.

The results obtained were as follows:

|  |  | Wet Acid Feed | Re-diluted and filtered acid | monosodium phosphates | potassium pyrophosphate |
|---|---|---|---|---|---|
| $P_2O_5$ | % | 53.6 | 54.5 | 24.6 | 22.6 |
| $SO_4$ | ppm | 8390 | 410 | 310 | 255 |
| F | ppm | 1225 | 225 | 49 | 57 |
| Cl | ppm | 61 | <10 | 19 | 15 |

EXAMPLE 8

Crystallization

A wet acid of analysis in Ex. 6, 7 and 9 was heated to about 450° C. in a single cell as described with reference to FIG. 1 to give a concentrated acid of 81% $P_2O_5$. The acid was then diluted with water and filtered to give a clear green acid of 57.3% $P_2O_5$ strength (Stage 1).

Crystals of thermal phosphoric acid hemi hydrate (0.3% w/w) were added to a sample of this re-diluted acid and stirred for 1 hour at −30° C. Crystals were separated from the mother liquid by centrifuge and filtration (Stage 2). The crystals were remelted and this acid was re-crystallised at 15° C. for 5 minutes using 0.3% w/w of phosphoric acid hemi hydrate crystals (obtained from a solvent purified acid as in Ex. 1. The second crystals obtained were separated from mother liquor by centrifuge and filtration (Stage 3).

The results are as follows:

|  |  | Starting-wet acid | Re-diluted wet acid | ← Stage 1 → Mother liquor from crystals | ← Stage 2 → Crystals | ← Stage 3 → Mother liquor from crystals | Second Crystals |
|---|---|---|---|---|---|---|---|
| $P_2O_5$ | % | 53.6 | 57.3 | 56.0 | 63.9 | 63.2 | 65.2 |
| $SO_4$ | ppm | 8390 | 483 | 573 | 123 | 165 | <100 |
| F | ppm | 1225 | 123 | 140 | 35 | 42 | 8 |

EXAMPLE 9

A wet acid was heated to 510° C. in a single cell as described to give a concentrated acid containing 82.5% $P_2O_5$ and solid impurities. The concentrated acid was then diluted with water to give a diluted suspension which was filtered to give a clear green acid of 70.1% $P_2O_5$ strength. Crystals of thermal acid hemi hydrate (0.1% w/w) were added to a sample of this rediluted acid and stood for 5 hours at 25° C. Crystals were separated from the mother liquor by centrifuge. The separated crystals, anhydrous acid, comprised 46% by weight and the mother liquor 54% by weight of the re-diluted acid. Analyses are as follows (All figures in ppm except where stated otherwise).

|  | Starting Wet acid | Rediluted Wet acid | Crystals | Mother Liquor |
|---|---|---|---|---|
| $P_2O_5$ | 53.6% | 70.1% | 72.3% | 68.25% |
| $SO_4$ | 0.84% | 570 | 320 | 800 |
| F | 0.12% | 92 | 49 | 127 |

EXAMPLE 10

A wet acid obtained by the acidulation of Florida rock was concentrated by heating to a temperature of 605° C. in a single cell as hereinbefore described with reference to the accompanying drawings. The acid was rediluted and filtered to give a product acid. The analysis of the initial wet acid and the product acid were as follows:

|  |  | Initial Wet Acid | Product Acid |
|---|---|---|---|
| $P_2O_5$ | % | 54.1 | 52.6 |
| $SO_4$ | ppm | 29000 | <100 ppm |
| F | ppm | 2200 | 40 |
| oxidizable |  |  |  |
| C | ppm | 4300 | 10 |
| Al | ppm | 5800 | 570 |
| Fe | ppm | 7600 | 3860 |
| Mg | ppm | 4000 | 4640 |
| Ti | ppm | 350 | 85 |
| Cr | ppm | 85 | 35 |

EXAMPLE 11

A wet process phosphoric acid was heated to about 450° C., in a single cell as described above to give a concentrated acid of 81% $P_2O_5$ and solid impurities. The concentrated acid was diluted with water and the diluted hydrolysed acid was filtered to leave a clear, post-precipitate-free acid of 72.3% $P_2O_5$ and 12% poly $P_2O_5$ strength (stage 1). The solid impurities contained 15% of the $P_2O_5$ in the feed and had an analysis of 78% $P_2O_5$, 7% $Al_2O_3$, 9.7% $Fe_2O_3$ and 1.5% Mgo. Seed crystals of an anhydrous phosphoric acid (0.3% w/w) were added to a sample of this hydrolysed acid and stirred for 15 minutes at 25° C. Crystals were separated from the mother liquor by centrifuge (stage 2). Upon remelting the crystals this acid was recrystallized at 25° C. using 0.3% w/w of anhydrous crystals as seed for 10 minutes and again the crystals separated by centrifuge and remelted (stage 3). A further re-crystallization under similar conditions give crystalline product acid (stage 4).

|  | Stage 1 | | Stage 2 | | Stage 3 | | Stage 4 | |
|---|---|---|---|---|---|---|---|---|
|  | Feed to Evaporator | Feed to Crystallizer | Mother Liquor | Crystals | Mother Liquor | Crystals | Mother Liquor | Crystals |
| $P_2O_5$ | 63 | 72.3 | 70.9 | 72.1 | 69.5 | 72.1 | 70.1 | 72.2 |
| $SO_4$ | 31,000 | 2000 | 2000 | 480 | 1200 | 100 | 200 | 70 |
| F | 950 | 140 | 180 | 50 | 100 | 15 | 25 | <10 |
| Fe | 11,600 | 2700 | 3300 | 870 | 1750 | 150 | 310 | 35 |
| Al | 6900 | 1000 | 1300 | 310 | 660 | 60 | 130 | 13 |
| Mg | 6500 | 6400 | 8900 | 2300 | 4200 | 355 | 740 | 80 |
| Na | 1500 | 1750 | 2350 | 620 | 1200 | 240 | 300 | 140 |

EXAMPLE 12

A wet process acid of concentration and impurity content as in Ex. 6–9 has heated in a single cell as described above to 500° C. to give a suspension of concentrated acid of 82% $P_2O_5$, 2020 ppm Fe and 710 ppm Al, which was diluted with water and hydrolysed, then filtered to give a clear phosphoric acid of 72.5% $P_2O_5$ (of which 12% is poly $P_2O_5$). 55 parts of this acid were mixed with 37 parts of recycled third mother liquor and 8 parts of melted third crop of crystals (see below) and the mixture (containing 73.4% $P_2O_5$, 2005 ppm Fe and 710 ppm Al) was crystallized at 25° C. with seed crystals of anhydrous ortho phosphoric acid to give 50 parts of first crystals of anhydrous ortho acid and 50 parts of first mother liquor. The first mother liquor was crystallized at 20° C. for 30 minutes to give 20 parts of a second crop of crystals and 30 parts of a second mother liquor. The first crystals and second crop of crystals were combined, melted and crystallized at 25° C. for 10 minutes to give 33 parts of product crystalline anhydrous ortho acid (with 150 ppm Fe, 75 ppm Al) which was separated from 37 parts of mother liquor, the third mother liquor which was recycled to the initial crystallization. The second mother liquor was crystallized at 16° C. for 75 minutes to give 8 parts of a third crop of crystals which were recycled after melting into the initial crystallization and 22 parts of a fourth mother liquor which was recycled to the evaporator feed acid. Thus overall 55 parts of the filtered diluted acid from the evaporator were obtained 33 parts of twice crystallized acid.

We claim:

1. A method for the production of purified phosphoric acid or phosphatic derivatives of wet process phosphoric acid which comprises heating wet process phosphoric acid in an evaporator vessel having carbon walls which are electrically conducting and which are stable to the concentrated phosphoric acid at the evaporation temperatures, to evaporate water therefrom to leave a concentrated acid by direct electrical resistance heating by passing an alternating current through said wet process acid until the concentration of said acid is at least 76% by weight $P_2O_5$, precipitating solid impurities in said concentrated acid and separating solid impurities from the purified phosphoric acid or phosphatic derivative.

2. A method according to claim 1 wherein the concentrated acid is diluted to form a diluted acid or phosphate derivative thereof of 50–75% $P_2O_5$ by weight, and the precipitated solid impurities are separated from the said acid or derivative thereof.

3. A method according to claim 2 wherein a solid phosphoric or condensed phosphoric acid is recovered by crystallization from the product acid obtained by dilution of the concentrated acid with water and separation of the solid impurities from said diluted acid leaving product acid.

4. A method according to claim 3 wherein the concentrated acid is diluted to a concentration corresponding substantially to that of orthophosphoric acid and, after separation of the solid impurities, orthophosphoric acid is crystallised therefrom.

5. A method according to claim 4 wherein the concentrated acid is diluted with water to an acid of 70–74% $P_2O_5$ concentration, and after separation of the solid impurities anhydrous ortho phosphoric acid is crystallized therefrom.

6. A method according to claim 5 wherein the crystallization gives first crystals and a mother liquor from which a second crop of crystals are obtained by crystallization and the first crystals and second crop of crystals are mixed and melted, and the anhydrous ortho phosphoric acid crystallized from the melt and separated therefrom.

7. A method according to claim 6 wherein said evaporator vessel is a carbon vessel and wherein the acid is heated by passing alternating electric current through the acid between a carbon electrode and the carbon vessel.

8. A method according to claim 5 wherein said evaporator vessel is a carbon vessel and wherein the acid is heated by passing alternating electric current through the acid between a carbon electrode and the carbon vessel.

9. A method according to claim 4 wherein said evaporator vessel is a carbon vessel and wherein the acid is heated by passing alternating electric current through the acid between a carbon electrode and the carbon vessel.

10. A method according to claim 3 wherein the acid is concentrated to above 82% $P_2O_5$ and then diluted to a concentration corresponding substantially to pyrophosphoric acid and, after separation of the solid impurities, pyrophosphoric acid is crystallised therefrom.

11. A method according to claim 2 wherein said evaporator vessel is a carbon vessel and wherein the acid is heated by passing alternating electric current through the acid between a carbon electrode and the carbon vessel.

12. A method according to claim 1 wherein the wet process is concentrated to a $P_2O_5$ concentration corresponding substantially to that of a condensed phosphoric acid and, after separation of the solid impurities, the concentrated acid is crystallised.

13. A method according to claim 1 wherein the heating is substantially completely resistive heating.

14. A method according to claim 13 wherein wet process phosphoric acid is heated in a carbon vessel to evaporate water therefrom to leave a concentrated acid by direct electrical resistance heating by passing an alternating current through said acid between at least one carbon electrode and said carbon vessel, until the concentration of said concentrated acid is 80–86% by weight $P_2O_5$, precipitating solid impurities from said concentrated acid, diluting said concentrated acid to form a diluted acid of below 75% $P_2O_5$ concentration, separating precipitated solid impurities from said diluted acid to leave a product acid, crystallizing ortho phosphoric acid from said product acid, and separating crystals of said ortho acid from mother liquor.

15. A method according to claim 14 wherein the current passes under a voltage of 10–200 V with a current, for which the ratio of current in Amps to voltage in volts is at least 3:1.

16. A method according to claim 15 wherein the current passes under a voltage of 10–100 V with a current, for which the ratio of current in amps to voltage is at least 10:1.

17. A method according to claim 14 wherein the current density on the carbon vessel walls is less than 5 Amps per sq. in. and the current density on the carbon electrode in contact with the acid is at least 5 Amps per sq. in.

18. A method according to claim 1 wherein the acid is at least partially neutralised, before or after separation of solid impurities, with a base capable of forming a water soluble salt of the acid.

19. A method according to claim 18 wherein the base is an aqueous solution of a carbonate or hydroxide of ammonium, sodium, potassium or lithium or an alkylolamine.

20. A method according to claims 18 or 19 wherein the concentrated acid is at least partially neutralised to form an aqueous solution of polyphosphates prior to separation of the solid impurities.

21. A method according to claims 18 or 19 wherein the aqueous acid is diluted to a $P_2O_5$ concentration corresponding to that of ortho- or pyrophosphoric acid or a mixture thereof, prior to neutralisation and separation from the solid impurities.

22. A method according to claim 1 which comprises continuously passing a dilute phosphoric acid successively through a plurality of said evaporator vessels heating the acid in each successive evaporator by direct electrical resistance heating by passing an alternating current through said acid to progressively higher temperatures sufficient to evaporate water from the acid in each evaporator and to progressively increase the concentration of the acid.

23. A method according to claim 22 wherein the acid in the final evaporator is concentrated to more than 78% by weight $P_2O_5$.

24. A method according to claims 22 or 23 wherein the vapour from at least the first evaporator is recovered separately from the vapour from at least the last evaporator.

25. A method according to any one of claims 1, 22 and 23 wherein at least the last evaporator comprises a carbon vessel provided with a carbon electrode and the acid is heated by passing an alternating electric current therethrough between the electrode and the vessel.

26. A method according to claim 1 wherein the acid is heated above 400° C.

27. A method according to claim 26 wherein the acid is heated above 500° C.

28. A method according to claim 26 wherein the acid is heated from 450° to 550° C.

29. A method according to claim 1 wherein the acid is heated in carbon apparatus.

30. A method according to claim 29 wherein the current density on the carbon vessel walls is less than 5 Amps per sq. in. and the current density on the carbon electrode in contact with the acid is at least 5 Amps per sq. in.

31. A method according to claim 1 wherein the current passes under a voltage of 10-200 V with a current, for which the ratio of current in Amps to voltage in volts is at least 3:1.

32. A method according to claim 31 wherein the current passes under a voltage of 10-100 V with a current, for which the ratio of current in amps to voltage is at least 10:1.

33. A method according to claim 1 wherein the acid is concentrated to 80-86% by weight $P_2O_5$.

34. A method according to claim 1 wherein after separation from solid impurities and before, after, or without dilution, the acid is at least partially neutralised with a base capable of forming insoluble phosphates, and the insoluble phosphates are recovered from the neutralised acid.

35. A method according to claim 1 wherein the concentrated acid is dearsenified by heating with chloride.

36. A method according to claim 1 wherein the wet process phosphoric acid is partially purified prior to heating.

37. A method according to claim 1 wherein phosphoric acid is heated to a temperature of at least 650° C. and a distilled product acid is recovered from the vapour.

38. A method according to claim 1 wherein said wet process phosphoric acid is heated in an evaporator vessel which comprises a carbon vessel provided with a carbon electrode and the acid is heated by passing an alternating electric current therethrough between the electrode and the vessel.

39. A method according to claim 1 wherein said wet process phosphoric acid is heated in an evaporator vessel which comprises a vessel provided with an electrode and the acid is heated by passing an alternating electric current therethrough between the electrode and the carbon walls.

* * * * *